(12) United States Patent
Bharadwaj et al.

(10) Patent No.: US 11,436,491 B2
(45) Date of Patent: Sep. 6, 2022

(54) SYSTEM AND METHOD FOR IMPROVING CONVOLUTIONAL NEURAL NETWORK-BASED MACHINE LEARNING MODELS

(71) Applicant: Microsoft Technology Licensing, LLC, Redmond, WA (US)

(72) Inventors: Sujeeth S. Bharadwaj, Milpitas, CA (US); Bharadwaj Pudipeddi, San Jose, CA (US); Marc Tremblay, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 355 days.

(21) Appl. No.: 16/818,391

(22) Filed: Mar. 13, 2020

(65) Prior Publication Data

US 2021/0287083 A1 Sep. 16, 2021

(51) Int. Cl.
*G06N 3/08* (2006.01)

(52) U.S. Cl.
CPC ..................... *G06N 3/08* (2013.01)

(58) Field of Classification Search
USPC ..... 706/6, 12, 15, 16, 20, 22, 25, 33, 41, 43
See application file for complete search history.

(56) References Cited

U.S. PATENT DOCUMENTS

2019/0108618 A1* 4/2019 Hwang ................. G06T 3/4015

FOREIGN PATENT DOCUMENTS

WO        2020043296 A1    3/2020
WO   WO 2020/043296   *   3/2020  ............... G06T 7/11

OTHER PUBLICATIONS

"International Search Report & Written Opinion issued in PCT Application No. PCT/US2021/014204", dated May 18, 2021, 30 Pages.

Chen, et al., "Drop an Octave: Reducing Spatial Redundancy in Convolutional Neural Networks with Octave Convolution", In Repository of arXiv:1904.05049v3, Aug. 18, 2019, 12 Pages.

* cited by examiner

*Primary Examiner* — Yosef K Laekemariam
(74) *Attorney, Agent, or Firm* — Fiala & Weaver P.L.L.C.

(57) ABSTRACT

Improved convolutional neural network-based machine learning models are disclosed herein. A convolutional neural network is configured to decompose feature maps generated based on a data item to be classified. The feature maps are decomposed into a first and second subsets. The first subset is representative of high frequency components of the data item, and the second subset is representative of low frequency components of the data item. The second subset is upsampled and is combined with the first subset. The combined feature maps are convolved with a filter to extract a set of features associated with the data item. The first subset is also downsampled and combined with the second subset. The combined feature maps are convolved with a filter to extract another set of features. The data item is classified based on the sets of features extracted based on the convolution operations.

20 Claims, 9 Drawing Sheets

SYSTEM AND METHOD FOR IMPROVING CONVOLUTIONAL NEURAL NETWORK-BASED MACHINE LEARNING MODELS

BACKGROUND

Advances in computing have led to the recent usage of machine learning to automate many tasks. Machine learning (ML) has proven itself in multiple consumer applications such as web ranking and recommendation systems. In the context of enterprise scenarios, ML is emerging as a compelling tool in a broad range of applications such as marketing/sales optimization, process automation, preventative healthcare, predictive maintenance, cybersecurity, fraud detection, among other things.

Certain ML techniques are based on artificial neural networks (also known as "neural nets"). Artificial neural networks are programs loosely based on the human brain. Neural nets consist of many connected neurons. A neuron is a function that takes in inputs and returns an output. Each neuron is generally associated with a weight, which emphasizes the importance of a particular neuron. For instance, suppose a neural network is configured to classify whether a picture is a bird. In this case, neurons containing features of a bird would be weighed more than features that are atypical of a bird.

The weights of a neural network are learned through training on a dataset. The network executes multiple times, changing its weights through backpropagation with respect to a loss function. In essence, the neural network tests data, makes predictions, and determines a score representative of its accuracy. Then, it uses this score to make itself slightly more accurate by updating the weights accordingly. Through this process, a neural network can learn to improve the accuracy of its predictions.

Convolutional neural networks are a special type of neural network. Such networks comprise a plurality of different layers that apply functions to extract various features from a data item inputted thereto and reduce the complexity of the data item. Convolutional neural networks are trained in a similar manner as other artificial neural networks, where the convolutional neural network is initialized with random weights, makes a prediction using these randomized weights, and determines its accuracy using a loss function. The weights are then updated based on the loss function in an attempt to make a more accurate prediction.

Convolutional neural networks have been wildly successful, are a common modeling choice in computer vision, and are used frequently in other applications such as speech recognition and natural language processing. Improvements at all levels, from new operations to scalable architectures and normalization techniques, have been largely focused on final model accuracy. However, recent contributions are gravitating towards making these models more efficient while sacrificing accuracy.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for improving convolutional neural network-based machine learning models. For instance, a convolutional neural network is configured to decompose feature maps generated based on a data item to be classified. The feature maps are decomposed into a first subset and a second subset. The first subset is representative of high frequency components of the data item, and the second subset is representative of low frequency components of the data item. The second subset of feature maps is upsampled using learnt upsampling-based techniques and is combined with the first subset of feature maps. The combined feature maps are convolved with a filter to extract a set of features associated with the data item. The first subset of feature maps is also downsampled and combined with the second subset of features maps. The combined feature maps are convolved with a filter to extract another set of features associated with the data item. The data item is classified based on the sets of features extracted based on the convolution operations.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIGS. 2A-2C show diagrams representing a convolution operation with respect to an image in accordance with an example embodiment.

FIGS. 3A-3C show diagrams representing a pooling operation with respect to a feature map in accordance with an example embodiment.

FIGS. 6A-6C depict diagrams illustrating a transposed convolution operation utilized for upsampling a feature map in accordance with an example embodiment.

Figure 1:
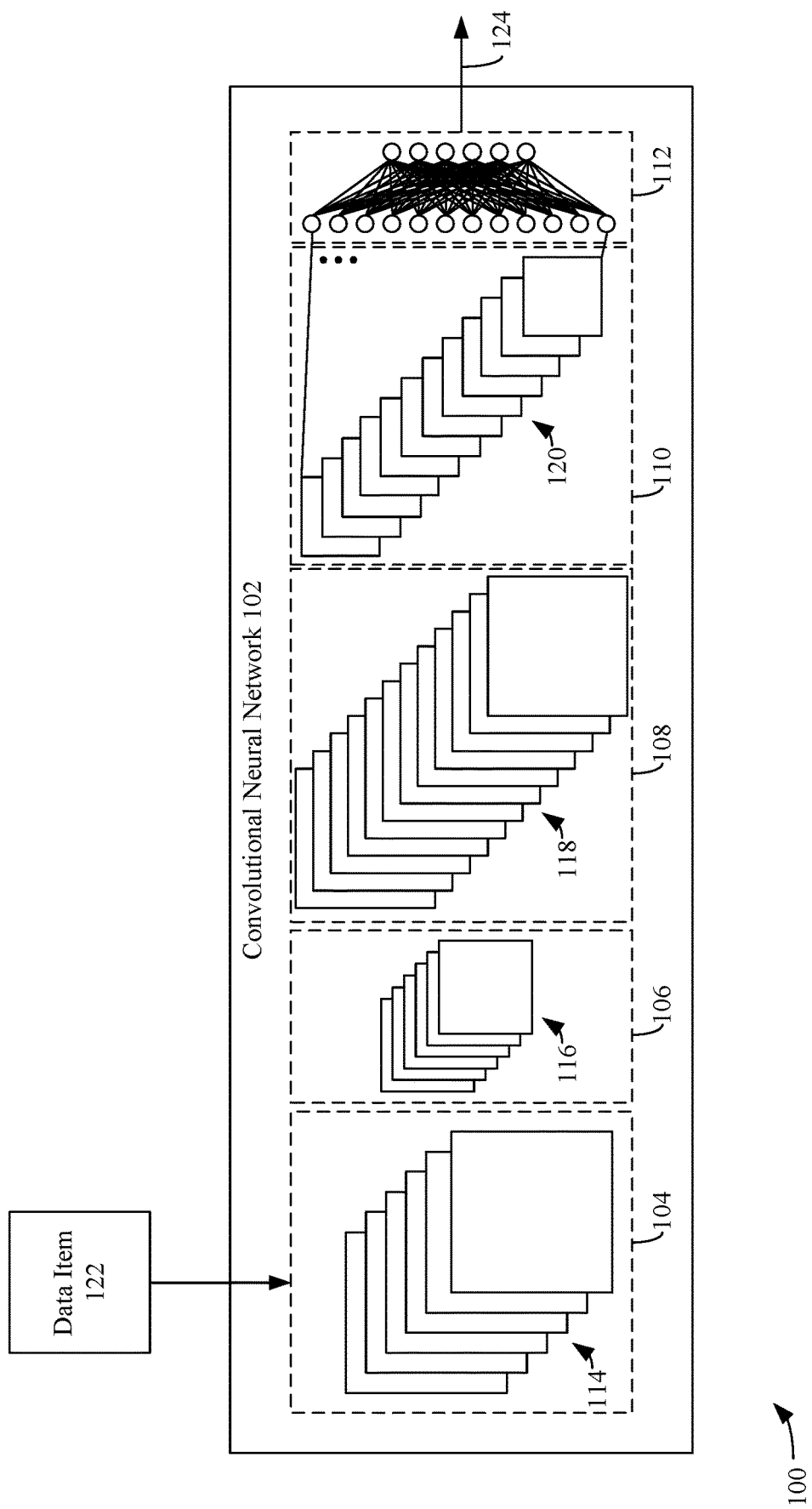
FIG. 1 shows a block diagram of a system for classifying data items using a convolutional neural network in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to improving convolutional neural network-based machine learning models. For instance, as described herein, a convolutional neural network is configured to decompose feature maps generated based on a data item to be classified. The feature maps are decomposed into a first subset and a second subset. The first subset is representative of high frequency components of the data item, and the second subset is representative of low frequency components of the data item. The second subset of feature maps is upsampled using learnt upsampling-based techniques and is combined with the first subset of feature maps. The combined feature maps are convolved with a filter to extract a set of features associated with the data item. The first subset of feature maps is also downsampled and combined with the second subset of features maps. The combined feature maps are convolved with a filter to extract another set of features associated with the data item. The data item is classified based on the sets of features extracted based on the convolution operations.

The embodiments described herein advantageously improve the performance of convolutional neural network-based machine learning models. In particular, as described herein, the number of convolutions required to extract features based on different frequency-based subsets of feature maps is reduced than when compared to conventional frequency-based convolution techniques. This advantageously reduces the processing overhead required to both train a convolutional neural network and classify a data item using the convolutional neural network. Still further, the speed at which the convolutional neural network is trained and at which a data item is classified is also increased.

Moreover, the classifications generated by such models are more accurate. As such, any technological field in which such models are utilized are also improved. For instance, consider a scenario in which a convolutional neural network-based machine learning model is used in an industrial process, such as predictive maintenance. The ability to predict disruptions to the production line in advance of that disruption taking place is invaluable to the manufacturer. It allows the manager to schedule the downtime at the most advantageous time and eliminate unscheduled downtime. Unscheduled downtime hits the profit margin hard and also can result in the loss of the customer base. It also disrupts the supply chain, causing the carrying of excess stock. A poorly-functioning convolutional neural network-based machine learning model would improperly predict disruptions, and therefore, would inadvertently cause undesired downtimes that disrupt the supply chain.

Consider another scenario in which a convolutional neural network-based machine learning model is used for cybersecurity. The model would predict whether code executing on a computing system is malicious and automatically cause remedial action to occur. A poorly-functioning convolutional neural network-based machine learning model may mistakenly misclassify malicious code, thereby causing the code to comprise the system.

Consider yet another scenario in which a convolutional neural network-based machine learning model is used for autonomous (i.e., self-driving vehicles). Autonomous vehicles can get into many different situations on the road. If drivers are going to entrust their lives to self-driving cars, they need to be sure that these cars will be ready for any situation. What's more, a vehicle should react to these situations better than a human driver would. A vehicle cannot be limited to handling a few basic scenarios. A vehicle has to learn and adapt to the ever-changing behavior of other vehicles around it. Machine learning algorithms make autonomous vehicles capable of making decisions in real time. This increases safety and trust in autonomous cars. A poorly-functioning convolutional neural network-based machine learning model may misclassify a particular situation in which the vehicle is in, thereby jeopardizing the safety of passengers of the vehicle.

Consider a further scenario in which a convolutional neural network-based machine learning model is used in biotechnology for predicting a patient's vitals, predicting whether a patient has a disease, or analyzing an X-ray or MRI. A poorly-functioning convolutional neural network-based machine learning model may misclassify the vitals and/or the disease or inaccurately analyze an X-ray or MRI. In such a case, the patient may not receive necessary treatment.

These examples are just a small sampling of technologies that would be improved with more accurate convolutional neural network-based machine learning models. Embodiments for improved convolutional neural network-based matching learning models are described as follows.

For instance, FIG. 1 shows a block diagram of a system 100 for classifying data items using a convolutional neural network 102 in accordance with an embodiment. As shown in FIG. 1, system 100 includes convolutional neural network 102. Convolutional neural network 102 is configured to classify data items (e.g., data item 122). Data items include, but are not limited to, a digital image, video content, samples of speech, audio content, and/or textual content. Convolutional neural network 102 comprises a plurality of layers. The plurality of layers comprises at least a first convolutional layer 104, a first pooling layer 106, a second convolutional layer 108, a second pooling layer 110, and a fully-connected layer 112.

First convolutional layer 104 is configured to receive, as an input, data items (e.g., data item 122). For each data item 122 received, first convolutional layer 106 is configured to extract a first set of features therefrom. Examples of the first set of features comprise, lower level features, such as edges, curves, and/or colors. The features are extracted by applying one or more filters (also known as "kernels") to various portions of data item 122. In particular, each filter is convolved with various portions of data item 122 to produce a feature map 114 (also referred to as an activation map). Each of feature maps 114 capture the result of applying its associated filter to the various portions of data item 122. As shown in FIG. 1, six feature maps have been generated, meaning six different filters were applied to data item 122. In an example in which data item 122 is an image, a first filter may be configured to extract edges in data item 122, a second filter may be configured to extract the smoothness in data item 122, a third filter may be configured to extract a particular color of data item 122, etc. Feature maps 114 are provided to first pooling layer 106.

Figures 2A, 2B:
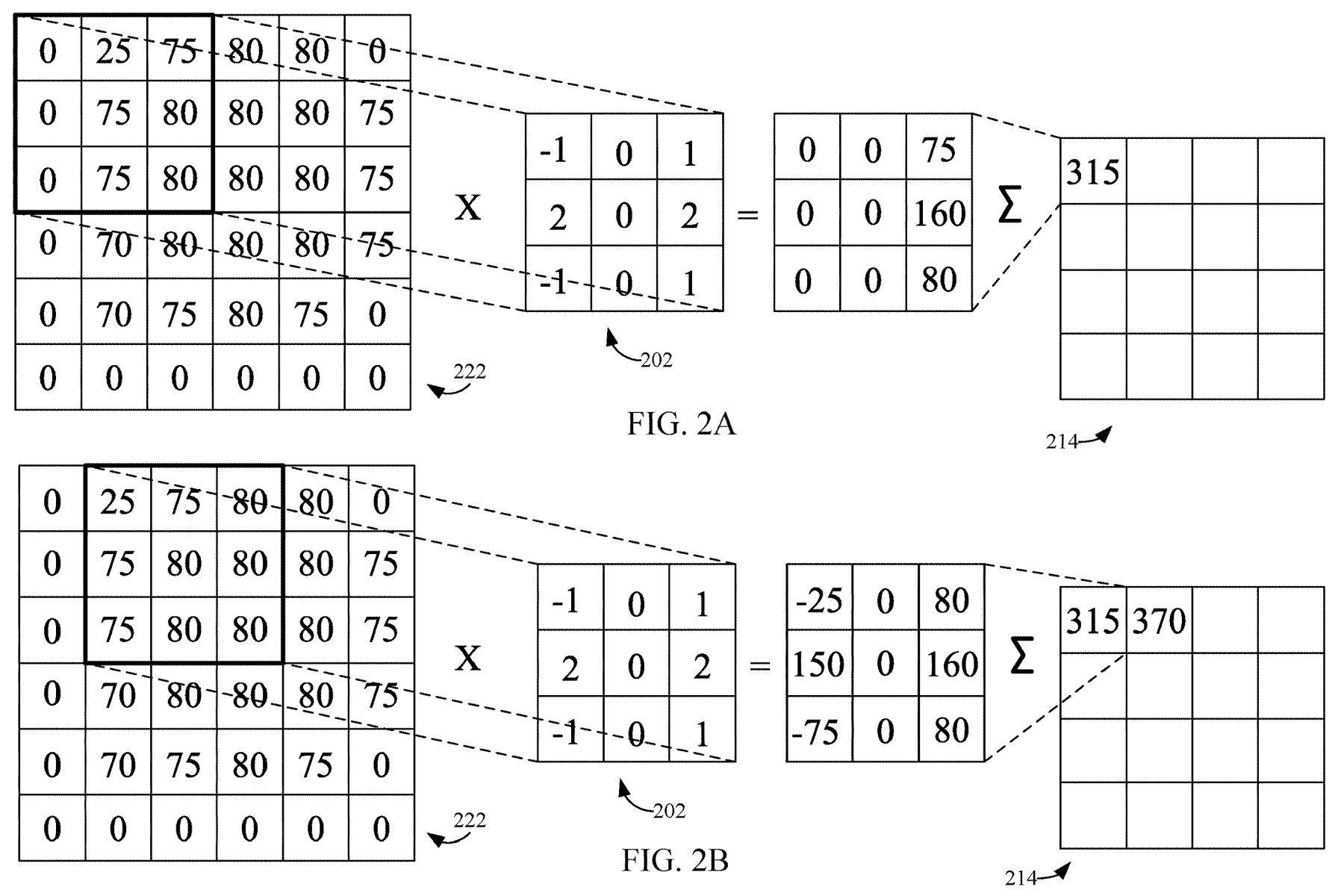
Figures 2C, 3A, 3B, 3C:
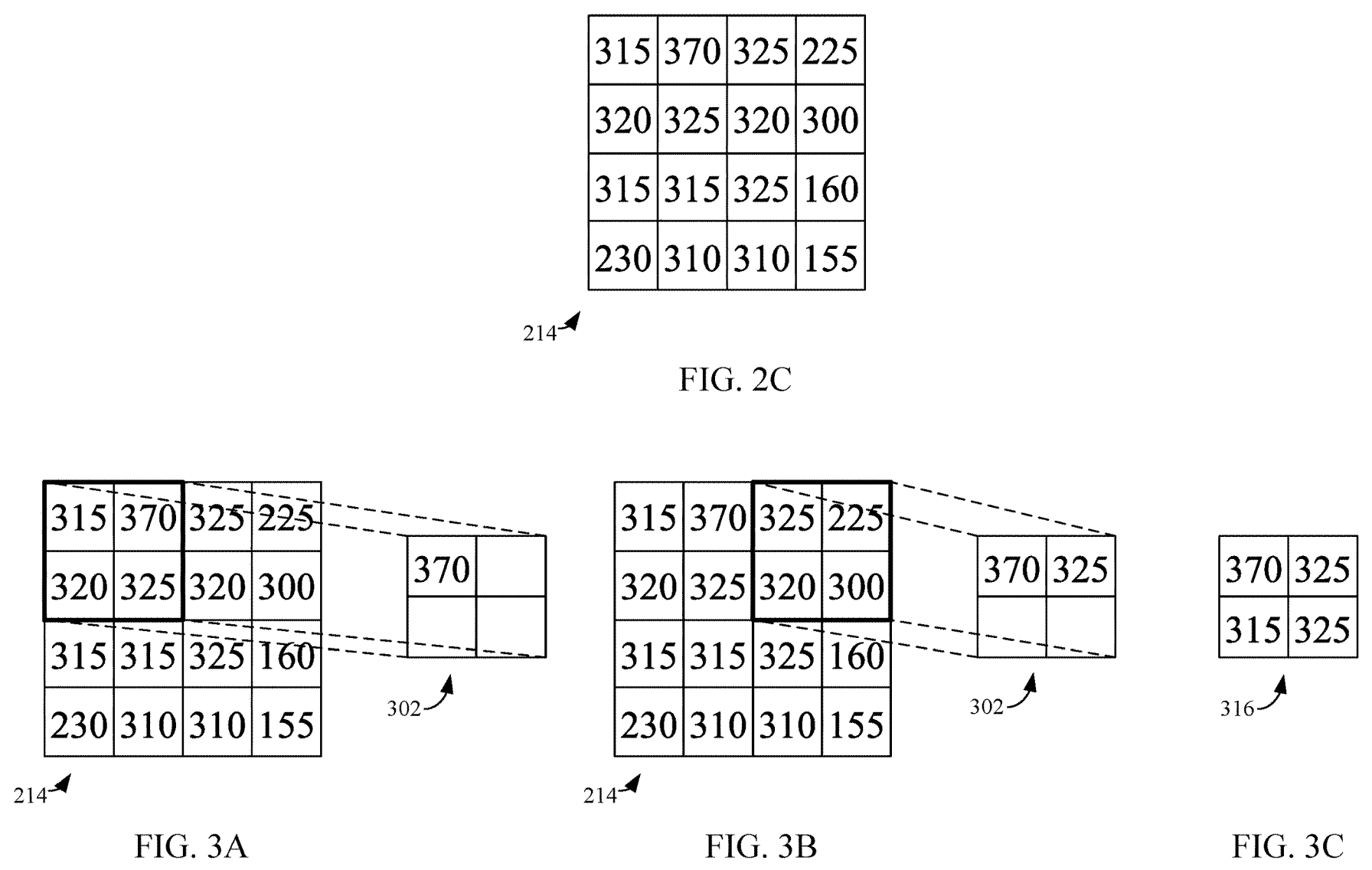

FIGS. 2A-2C show diagrams representing a convolution operation with respect to an image 222 in accordance with an embodiment. Image 222 is an example of data item 122, as described above with reference to FIG. 1. Image 222 is represented in the form of arrays of pixel values. To perform the convolution, a filter 202 is initially applied on the top-left corner of image 222. As shown in FIG. 2A, filter 202 is a Sobel filter configured to detect vertical edges in image 222, although the embodiments described herein are not so limited. The pixel values of image 222 that are covered by filter 202 are multiplied with the corresponding filter values of filter 202, and the products are summated. The result (i.e., 315) is placed in a corresponding location in feature map 214. Feature map 214 is an example of feature map 114, as described above with reference to FIG. 1.

As shown in FIG. 2B, filter 202 is shifted over by one or more pixels and the process is repeated. In the example shown in FIG. 2B, the value of 370 is stored in feature map 214 for this iteration. The process is repeated until all of the possible regions in image 222 are filtered. For example, FIG. 2C depicts a feature map 214 with all of its values determined. As shown in FIG. 2C, the dimensions of feature map 214 are smaller than the dimensions of image 222. However, the embodiments described are not so limited. If desired, the same dimensions may be retained by padding feature map 214 with particular values (e.g., 0).

It is noted that a two-dimensional convolution operation is shown via FIGS. 2A-C for simplicity. However, in certain embodiments, the convolution operation is performed via three dimensions. For instance, each image 222 may be represented as a three-dimensional matrix with a dimension for width, a dimension for height, and a dimension for depth, where depth corresponds to RGB color channels used in image 222.

Multiple filters (each configured to detect a different feature) may be applied to image 222 to generate a corresponding feature map 214. Referring again to FIG. 1, feature maps 114 are provided to first pooling layer 106. In accordance with an embodiment, before providing feature maps 214 to first pooling layer 106, feature maps 214 may be provided to a rectifier linear unit (ReLU), which performs an element-wise operation that sets any negative pixel value in feature map 214 to zero.

First pooling layer 106 is configured to perform a downsampling operation that reduces the dimensionality of each of feature maps 114 to generate pooled feature maps 116. Pooled feature maps 116 are provided to second convolutional layer 108. This enables subsequent layers of convolutional network 102 (e.g., second convolutional layer 108, second pooling layer 110, and fully-connected layer 112) to determine larger-scale detail than just edges and curves. The downsampling may be performed by applying a filter having a smaller dimensionality to each of feature maps 114. In accordance with an embodiment, the filter is configured to determine a maximum value in each region of a particular feature map 114 covered by the filter. In accordance with another embodiment, the filter is configured to determine an average value for each region of a particular feature map 114. In either case, the filter applied to feature maps 114 may be associated with a stride that specifies how many pixel values the filter is to be shifted across each of feature maps 112.

For example, FIGS. 3A-3C show diagrams representing a pooling operation with respect to feature map 214 in accordance with an embodiment. Filter 302 is configured to determine the maximum value in the region of feature map 214 to which filter 302 is applied. As shown in FIG. 3A, a 2×2 filter 302 is initially applied on the top-left corner of feature map 214. In the example shown, the maximum value in this initial region is 370. Accordingly, the value 370 is stored in a corresponding location in filter 302. Filter 302 is associated with a stride value of 2. Accordingly, in the next iteration, filter 302 is shifted by two pixel values.

For example, as shown in FIG. 3B, filter 302 is shifted over by two pixel values, and the process is repeated. In the example shown in FIG. 3B, the value of 325 is stored in feature map 214 for this iteration. The process is repeated until all of the possible locations in feature map 214 are pooled. For example, FIG. 2C depicts a pooled feature map 316 with all of its values determined. Pooled feature map 316 is an example of pooled feature maps 116. As shown in FIG. 2C, the dimensions of pooled feature map 316 are smaller than the dimensions of feature map 212. Data item 122 (and feature maps 214 based thereon) may comprise a large amount of information (e.g., a large number of pixels). The pooling operation reduces the size of feature maps 214, while still keeping most of the relevant information.

Figures 4A, 4B, 4C:
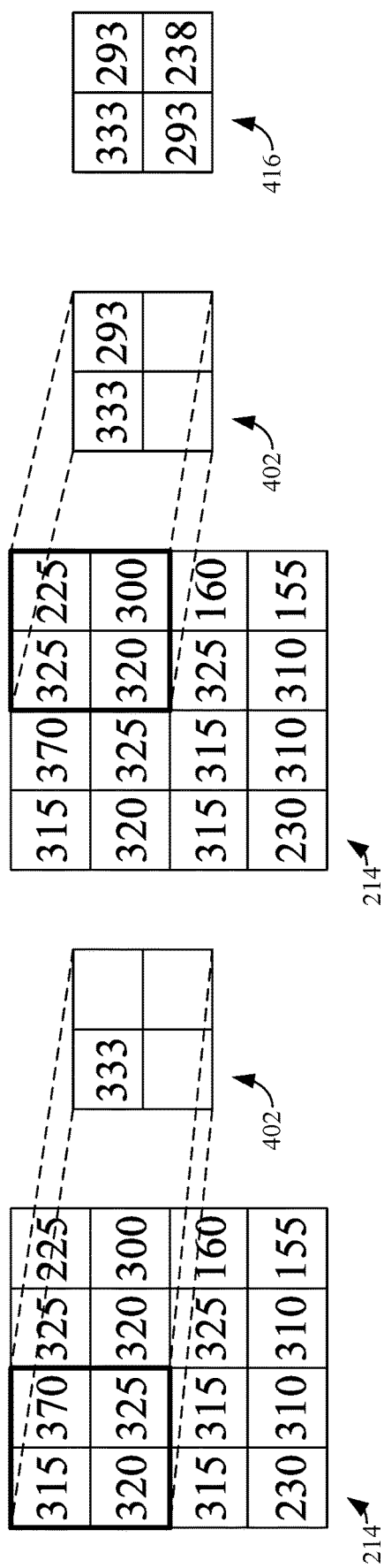
FIGS. 4A-4C show diagrams representing a pooling operation with respect to a feature map in accordance with another example embodiment.

FIGS. 4A-4C show diagrams representing a pooling operation with respect to feature map 214 in accordance with another embodiment. Filter 402 is configured to determine the average value in the region of feature map 214 to which filter 402 is applied. As shown in FIG. 4A, a 2×2 filter 402 is initially applied on the top-left corner of feature map 214. In the example shown, the average value in this initial region is 332.5. The value is rounded to 333, but the embodiments described herein are not so limited. Accordingly, the value 333 is stored in a corresponding location in filter 302. Filter 402 is associated with a stride value of 2. Accordingly, in the next iteration, filter 302 is shifted by two pixel values.

For example, as shown in FIG. 4B, filter 402 is shifted over by two pixel values, and the process is repeated. In the example shown in FIG. 4B, the value of 293 (rounded up from 292.5) is stored in feature map 214 for this iteration. The process is repeated until all of the possible locations in feature map 214 are pooled. For example, FIG. 4C depicts a pooled feature map 416 with all of its values determined. Pooled feature map 416 is an example of pooled feature maps 116.

It is noted that the pooling operations described with reference to FIGS. 3A-3C and FIGS. 4A-4C are purely exemplary and that other pooling operations may be utilized. Moreover, different stride values may also be utilized. For example, the stride for a particular filter (e.g., filter 302 and/or 402) may be configured to skip every other pixel value. In accordance with an embodiment, the stride value for a particular filter (e.g., filter 302 and/or 402) is learned during the training of convolutional neural network 102, as shown in FIG. 1. In accordance with another embodiment, the stride value for a particular filter (e.g., filter 302 and/or 402) is a predetermined or hardcoded value.

Referring again to FIG. 1, second convolutional layer 108 is configured to receive pooled feature maps 116. Second convolutional layer 108 is configured to extract a second set of features that are different than the first set of features extracted by first convolutional layer 104. Examples of the second set of features comprise higher level features, such as, shapes (e.g., circles, triangles, squares, etc.). The second set of features are extracted by applying one or more filters (that are different than the filter(s) utilized by first convolutional layer 104) to various portions of pooled feature maps 116. In particular, each filter is convolved with various portions of pooled feature maps 116 to generate second feature maps 118. Each of second feature maps 118 capture the result of applying its associated filter to the various portions of pooled feature maps 116. As shown in FIG. 1, twelve second feature maps 118 have been generated, meaning twelve different filters were applied to pooled feature maps 118. Second feature maps 118 are provided to second pooling layer 110.

Figure 5:
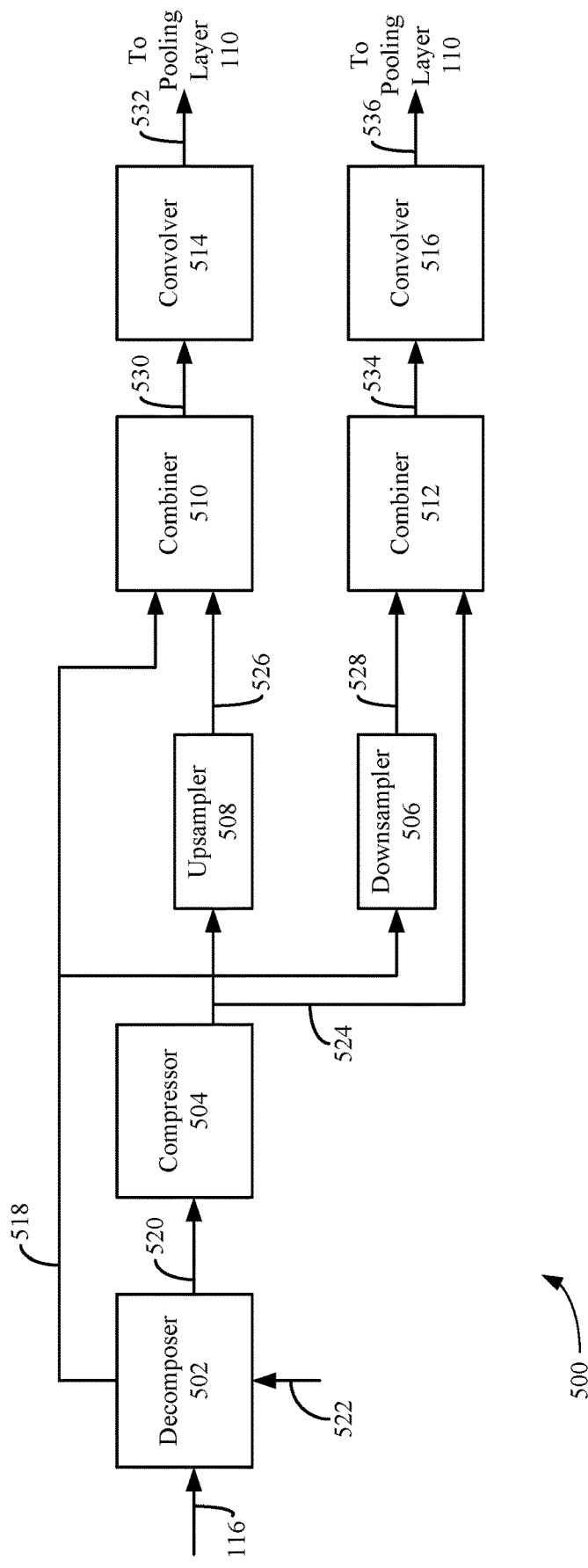
FIG. 5 shows a block diagram of a convolutional layer in accordance with an example embodiment.

In accordance with an embodiment, pooled feature maps 116 are decomposed into feature maps that comprise high frequency components of data item 122 and feature maps that comprise low frequency components of data item 122, and second convolutional layer 108 performs the convolution based on the such feature maps. For example, FIG. 5 depicts a block diagram of a convolutional layer 500 in accordance with an example embodiment. Convolutional layer 500 is an example of second convolutional layer 108, as described above with reference to FIG. 1. As shown in FIG. 5, convolutional layer 500 comprises a decomposer 502, a compressor 504, a downsampler 506, an upsampler 508, a first combiner 510, and a second combiner 512, a first convolver 514, and a second convolver 516.

Decomposer 502 is configured to receive, as an input, pooled feature maps 116, as described above with reference to FIG. 1. Decomposer 502 is configured to decompose pooled feature maps 116 into a first subset 518 and a second subset 520. First subset 518 is representative of high frequency components of the data item on which pooled feature maps 116 are based (e.g., data item 122). Second subset 520 is representative of low frequency components of the data item on which pooled feature maps 116 are based (e.g., data item 122). The low frequency components are an octave lower than the high frequency components (i.e., the low frequency components are half the spatial resolution of the high frequency components). For example, in an embodiment in which data item 122 is a digital image, information may be conveyed at different frequencies, where higher frequencies are encoded with the finer details of the digital image, where pixel values rapidly change over given spatial dimensions of the image, and lower frequencies are encoded with global structures not having as much detail (e.g., pixel values that change slowly over given spatial dimensions of the image). First subset 518 is provided to downsampler 506 and combiner 510, and second subset 520 is provided to compressor 504.

In accordance with an embodiment, the extent to which pooled feature maps 116 are to be decomposed into first subset 518 and second subset 520 is defined by a parameter 522. Parameter 522 defines a ratio between a first number of pooled feature maps 116 to be included in the first subset and a second number of pooled feature maps 116 to be included in the second subset.

In an embodiment, parameter 522 is a value between 0 and 1. In accordance with such an embodiment, the smaller the value set for parameter 522, the smaller the number of pooled feature maps 116 to be included in second subset 520 (i.e., a relatively smaller number of pooled feature maps 116 are allocated for the low frequency components). A value of 0.5 for parameter 522 causes the number of pooled feature maps 116 that are included in each of first subset 518 and second subset 518 to be equal. A value of 0 for parameter 522 causes the number of pooled feature maps 116 that are included in second subset 518 to be 0 (i.e., all of pooled feature maps 116 are allocated for the high frequency components). A value of 1 for parameter 522 causes the number of pooled feature maps 116 that are included in first subset 518 to be 0 (i.e., all of pooled feature maps 116 are allocated for the low frequency components).

In accordance with an embodiment, parameter 522 is configurable. In accordance with another embodiment, parameter 522 is a predetermined or hardcoded value. In accordance with yet another embodiment, parameter 522 is a machine-learnable parameter (e.g., determined during the training of convolutional neural network 102, as shown in FIG. 1).

Compressor 504 is configured to compress (or downsample) second subset 520 to generate compressed second subset 524. Much of the information represented via second subset 520 is spatially redundant. Accordingly, compressing second subset 520 advantageously reduces the amount of memory required to maintain second subset 520. Compressor 504 may use various techniques to compress second subset 520, including, but not limited to, the maximum pooling techniques or average pooling techniques, as described above. Compressed second subset 524 is provided to upsampler 508 and combiner 512.

Upsampler 508 is configured to upsample compressed second subset 524 to generate upsampled feature maps 526. Upsampler 508 utilizes a learnt upsampling technique to upsample compressed second subset 524. Learnt upsampling utilizes transposed convolutions to generate upsampled feature maps 526, where values of each feature map in compressed second subset 524 are convolved with a filter having a greater dimensionality. Upsampler 508 upsamples compressed second subset 524 to the resolution of first subset 518. Upsampled feature maps 526 are provided to combiner 510.

Figure 6A:
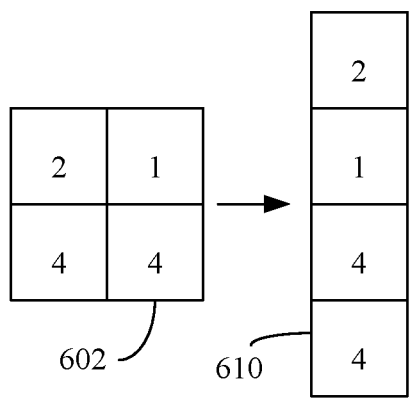
Figure 6B:
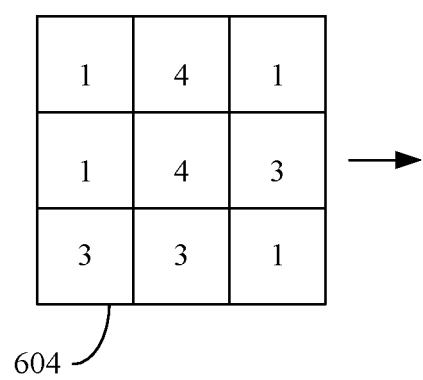
Figure 6C:
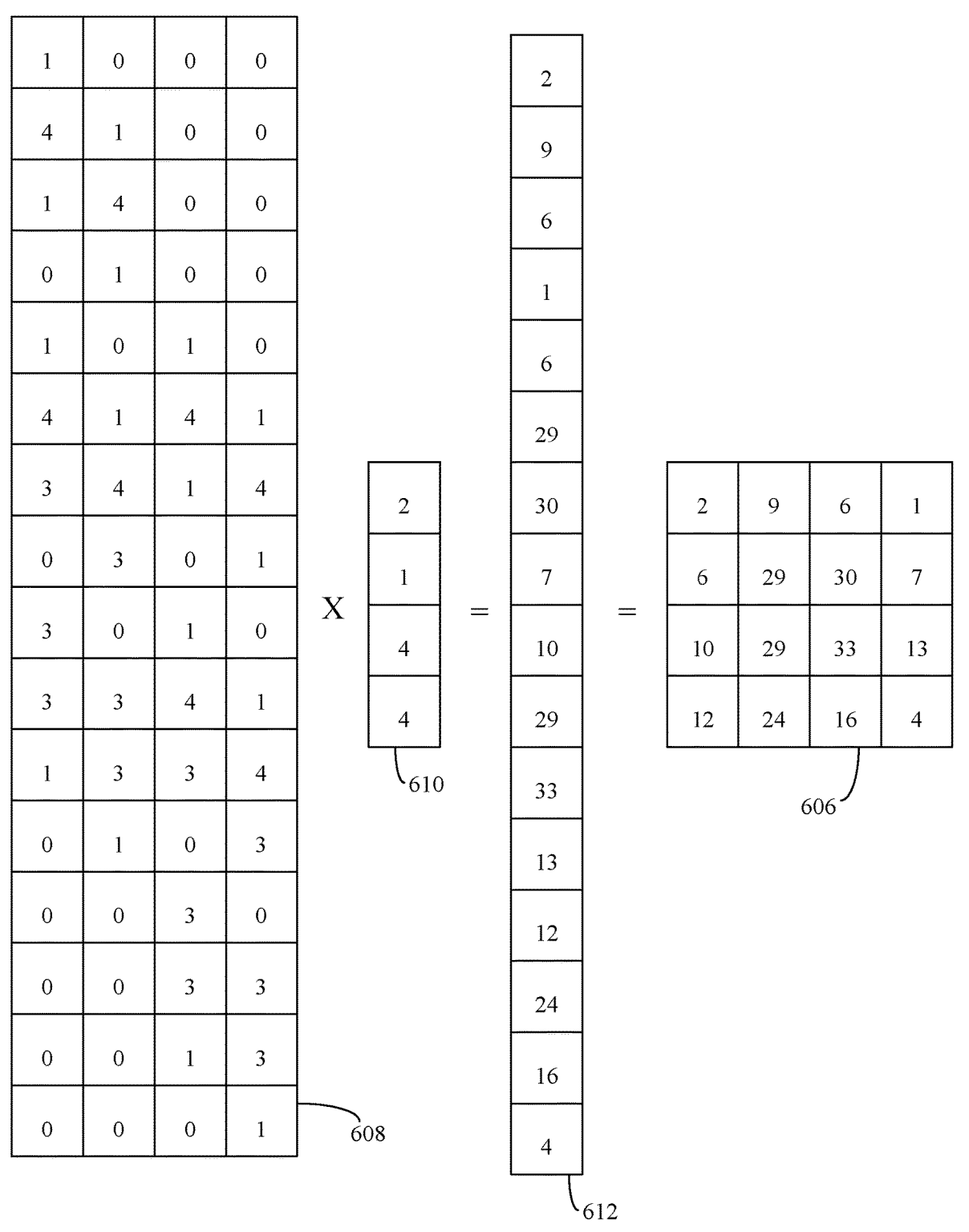

For example, FIGS. 6A-6C depict diagrams illustrating a transposed convolution operation utilized for upsampling a feature map in accordance with an embodiment. In the example shown in FIGS. 6A-6C, a 2×2 feature map 602 is being upsampled to a 4×4 feature map 606 (as shown in FIG. 6C). Feature map 602 is an example of a feature map included in compressed second subset 524, and upsampled feature map 606 is an example of a feature map included in upsampled feature maps 526. It is noted that the dimensions for feature map 602 and upsampled feature map 606 are purely exemplary and that feature map 602 and upsampled feature map 606 may have other dimensions.

To upsample feature map 602 to feature map 606, a 3×3 filter (or kernel) 604 is applied to feature map 602. For example, upsampler 508 converts filter 604 to a transposed convolution matrix 608, as shown in FIG. 6B, and flattens feature map 602 to a 1×4 flattened matrix 610, as shown in FIG. 6A. In the example shown in FIG. 6B, transposed convolution matrix 608 is a 4×16 matrix comprising all the values of filter 604 in each of the columns thereof. The elements in which the values of filter 604 are not stored are padded with zeroes.

As shown in FIG. 6C, upsampler 508 convolves transposed convolution matrix 608 with flattened matrix 610 to generate a 1×16 feature map 612. Feature map 612 is reshaped as a 4×4 matrix to generate upsampled feature map 606.

In accordance with an embodiment, the values (or weights) of filter 606 are machine-learnable parameters (e.g., determined during the training of convolutional neural network 102, as shown in FIG. 1).

Referring again to FIG. 5, upsampler 508 upsamples each feature map included in compressed second subset 524 to generate a plurality of upsampled feature maps 526. Upsampled feature maps 526 are provided to combiner 510.

Such an upsampling technique advantageously generates a more accurate representation or reconstruction of the original input (e.g., pooled feature maps 116) than other conventional upsampling techniques (e.g., nearest neighbor-based upsampling techniques, bi-linear interpolation, bi-cubic interpolation, etc.).

Referring again to FIG. 5, downsampler 506 is configured to downsample each feature map of first subset 518 to generate downsampled feature maps 528. Downsampler 506 may downsample each feature map of first subset 518 using various techniques, including, but not limited to, maximum pooling techniques or average pooling techniques, as described herein. Downsampler 506 downsamples first subset 518 to the resolution of second subset 520. Downsampled feature maps 528 are provided to combiner 512.

Combiner 510 is configured to combine the feature maps of first subset 518 with upsampled feature maps 526 to generate combined feature maps 530. In accordance with an embodiment, combiner 510 combines the feature maps of first subset 518 with upsampled feature maps 526 by concatenating the feature maps of first subset 518 with upsampled feature maps 526. By combining the feature maps of first subset 518 with upsampled feature maps 526, the high frequency components of data item 122 that are provided via the feature maps of first subset 518 are influenced by the low frequency parts of data item 122 that are provided via upsampled feature maps 526 (also referred to inter-frequency communication). This enables subsequent layers of conventional neural network 102 (e.g., fully connected layer 112) to be informed of features of both the high frequency components and the low frequency components of data item 122.

Convolver 514 is configured to extract the second set of features from combined feature maps 530. The second set of features are represented via output feature maps 532. The features are extracted in a similar manner as described above with first convolutional layer 104. For example, the features are extracted by applying filter(s) to various portions of combined feature maps 530. In particular, each filter is convolved with various portions of combined feature maps 530 to produce output feature maps 532. Each of output feature maps 532 captures the result of applying its associated filter to the various portions of combined feature maps 530. Output feature maps 530 are provided to second pooling layer 110, as shown in FIG. 1.

Combiner 512 is configured to combine the feature maps of compressed feature maps 524 with downsampled feature maps 528 to generate combined feature maps 534. In accordance with an embodiment, combiner 512 combines compressed feature maps 524 with downsampled feature maps 528 by concatenating compressed feature maps 524 with downsampled feature maps 528. By combining compressed feature maps 524 with downsampled feature maps 528, the low frequency components of data item 122 that are provided via compressed feature maps 524 are influenced by the high frequency parts of data item 122 that are provided via downsampled feature maps 528. This enables subsequent layers of conventional neural network 102 (e.g., fully connected layer 112) to be informed of features of both the low frequency components and the high frequency components of data item 122.

Convolver 516 is configured to extract the second set of features from combined feature maps 534. The second set of features are represented via output feature maps 536. The features are extracted in a similar manner as described above with first convolutional layer 104. For example, the features are extracted by applying filter(s) to various portions of combined feature maps 534. In particular, each filter is convolved with various portions of combined feature maps 534 to produce output feature maps 536. Each of output feature maps 536 captures the result of applying its associated filter to the various portions of combined feature maps 534. Output feature maps 536 are provided to second pooling layer 110, as shown in FIG. 1. Output feature maps 530 and output feature maps 536 are examples of second feature maps 118, as shown in FIG. 1.

As described above, only two convolutions (performed by convolvers 514 and 516) are required to extract features for a given portion of a feature map that has been decomposed into high frequency and low frequency components. Conventional convolutional neural networks require at least twice as many convolutions. Thus, the techniques described herein advantageously improve the performance of convolutional neural network-based machine learning models, as less processing overhead is required due the smaller number convolutions required.

In certain embodiments, first convolutional layer 104 comprises the same components as second convolutional layer 108. In accordance with such an embodiment, parameter 522 is set to 0, thereby causing decomposer 502 to not decompose pooled feature maps 116 into subsets 518 and 520 (i.e. all of pooled feature maps 116 are allocated for high frequency components). Moreover, various components (and operations performed thereby) are bypassed. For example, compressor 504, upsampler 508, downsampler 506, combiner 510, combiner 512, and convolver 516 may be bypassed, and convolver 514 applies filter(s) to pooled feature maps 116 directly.

Referring again to FIG. 1, second pooling layer 110 is configured to perform a downsampling operation that reduces the dimensionality of each of second feature maps 118 to generate pooled feature maps 120, which are provided to fully-connected layer 112. The downsampling may be performed by applying a filter having a smaller dimensionality to each of second feature maps 118 in a similar manner as performed by first pooling layer 106. In particular, second pooling layer 110 may use various techniques to downsample second feature maps 118, including, but not limited to, maximum pooling techniques or average pooling techniques, as described above.

Fully-connected layer 112 is configured to flatten pooled feature maps 120 into an single dimensional vector and determines which features most correlate to a particular classification. For example, if convolutional neural network 102 is trained to predict whether data item 112 is an image of a dog, the flattened vector may comprise high values that represent high level features likes a paw, four legs, etc. Similarly, if convolutional neural network 102 is trained to predict that data item 122 is a bird, the flattened vector may comprise high values that represent features such as wings, a beak, etc. Based on the analysis, fully-connected layer 112 outputs a classification 124 for data item 122. Classification 124 is based on a probability that data item 122 is a particular classification. Classification 124 may be provided to a user (e.g., via graphical user interface of an application utilized by the user) and/or may be provided to another application for use thereby.

It is noted that while convolutional neural network 102 includes two convolutional layers and two pooling layers, the embodiments described herein are not so limited and convolutional neural network 102 may include any number of convolutional layers and/or pooling layers, where each of the convolutional layers are configured to detect different features. For example, a first convolutional layer may be configured to detect low-level features (e.g., edges, curves, etc.), a second convolutional layer may be configured to detect mid-level features (e.g., shapes), a third convolutional layer may be configured to detect high-level features (e.g., eyes, paws, legs, arms, etc.), etc.

Figure 7:
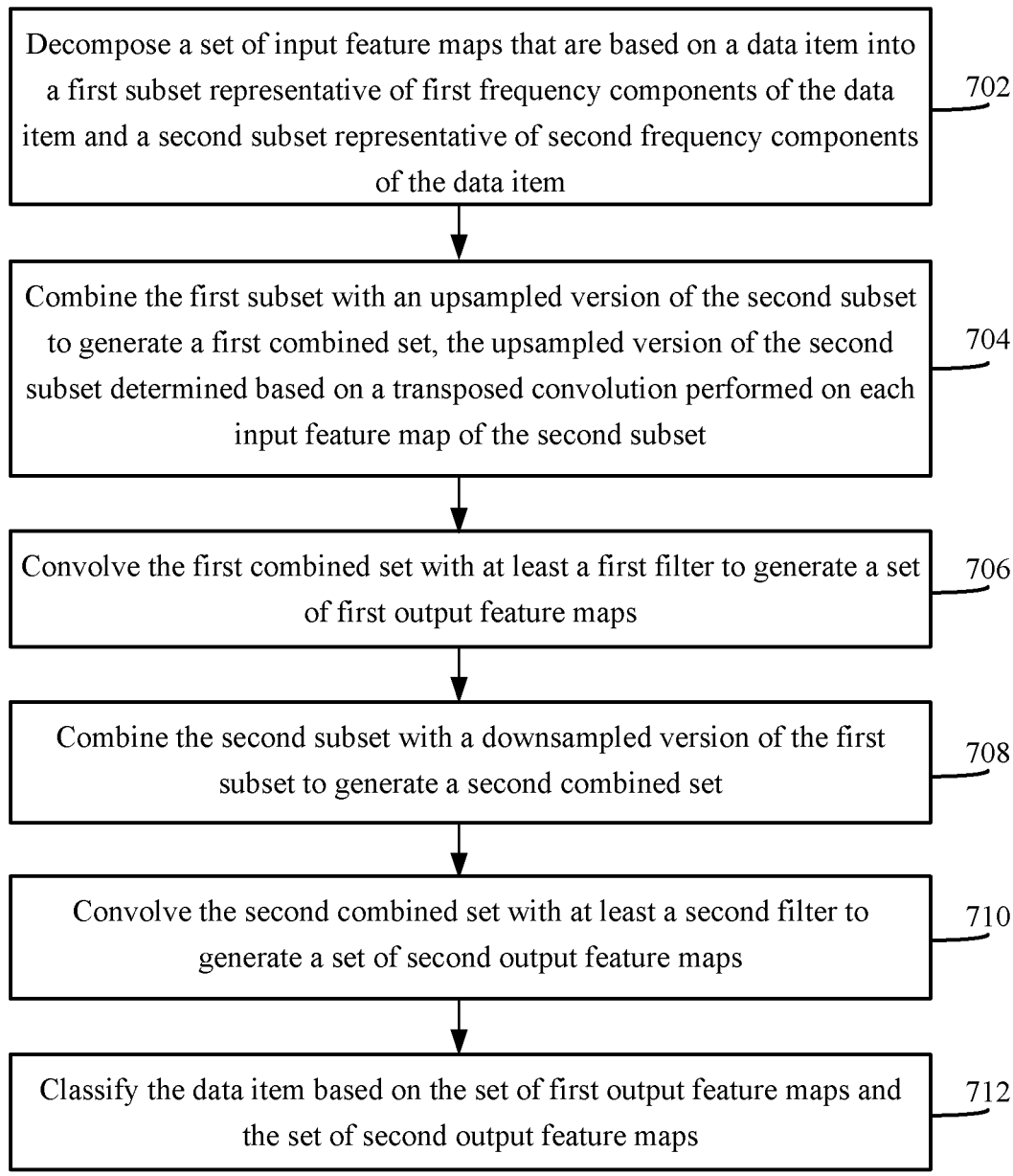
FIG. 7 shows a flowchart of a method for classifying a data item via a convolutional neural network, according to an example embodiment.

Accordingly, a convolutional neural network may be configured to classify data items in many ways. For example, FIG. 7 shows a flowchart 700 of a method for classifying a data item via a convolutional neural network, according to an example embodiment. In an embodiment, flowchart 700 may be implemented by convolutional neural network 102 and the layers included therein (e.g., convolutional layers 104 and 108 and convolutional layer 500, as described in FIG. 5) included therein. Accordingly, flowchart 700 will be described with continued reference to FIGS. 1 and 5. Other structural and operational embodiments will be apparent to persons skilled in the relevant art(s) based on the following discussion regarding flowchart 700, convolutional neural network 102 and convolutional layer 500.

Flowchart 700 of FIG. 7 begins with step 702. In step 702, a set of input feature maps that are based on a data item are decomposed into a first subset representative of first frequency components of the data item and a second subset representative of second frequency components of the data item. For example, with reference to FIG. 5, decomposer 502 decomposes a set of input feature maps (e.g., pooled feature maps 116) that are based on data item 122 into first subset 518 that is representative of first (e.g., high) frequency components of data item 122 and second subset 520 that is representative of second (e.g., low) frequency components of data item 122.

In accordance with one or more embodiments, decomposing the set of input feature maps comprises determining a parameter that defines a ratio between a first number of input feature maps to be included in the first subset and a second number of input feature maps to be included in the second subset and decomposing the set of input feature maps into the first subset and the second subset based on the parameter. For example, with reference to FIG. 5, decomposer 502 decomposes pooled feature maps 116 by determining parameter 522 that defines a ration between a first number of feature maps to be included in first subset 518 and a second number of feature maps to be included in second subset 520. Decomposer 502 decomposes the set of input feature maps into first subset 518 and second subset 520 based on parameter 522.

In accordance with one or more embodiments, the second frequency components are an octave lower than the first frequency components.

In accordance with one or more embodiments, the data item comprises at least one of a digital image, an audio signal, a speech signal, or textual content.

In step 704, the first subset is combined with an upsampled version of the second subset to generate a first combined set, the upsampled version of the second subset determined based on a transposed convolution performed on each input feature map of the second subset. For example, with reference to FIG. 5, combiner 510 combines first subset 518 with an upsampled version of second subset 520 (e.g., upsampled feature maps 526) to generate a first combined set (e.g., combined feature maps 530). Upsampler 508 is configured to generate upsampled feature maps 526 based on a transposed convolution performed on each feature map of compressed second subset 524.

In accordance with one or more embodiments, the second subset is upsampled to the resolution of the first subset. For example, with reference to FIG. 5, upsampler 508 upsamples compressed second subset 524 to the resolution of first subset 518.

In step 706, the first combined set is convolved with at least a first filter to generate a set of first output feature maps. For example, with reference to FIG. 5, the first combined set (e.g., combined feature maps 530) is convolved with a first filter (e.g., filter 202, as shown in FIGS. 2A-2B) to generate a set of first output feature maps (e.g., output feature maps 532)

In step 708, the second subset is combined with a downsampled version of the first subset to generate a second combined set. For example, with reference to FIG. 5, combiner 512 combines the second subset (e.g., compressed second subset 524) with a downsampled version of first subset 518 (e.g., downsampled feature maps 528) to generate a second combined set (e.g., combined feature maps 534).

In accordance with one or more embodiments, the downsampled version of the first subset is determined based on a pooling operation performed on each input feature map of the first subset. For example, with reference to FIG. 5, downsampler 506 determines downsampled feature maps 528 based on a pooling operation performed on each feature map of first subset 518. Downsampler 506 may use various techniques to downsample first subset 518, including, but not limited to, the maximum pooling techniques or average pooling techniques, as described above.

In accordance with one or more embodiments, the downsampled version of the first subset is generated by downsampling the first subset to the resolution of the second subset. For example, with reference to FIG. 5, downsampler 506 downsamples first subset 518 by downsampling first subset 518 to the resolution of second subset 520.

In step 710, the second combined set is convolved with at least a second filter to generate a set of second output feature maps. For example, with reference to FIG. 5, convolver 516 convolves the second combined set (e.g., combined feature maps 534) with at least a second filter (e.g., filter 202, as shown FIGS. 2A-2B), to generate a set of second output feature maps (e.g., output feature maps 536).

In step 712, the data item is classified based on the set of first output feature maps and the set of second output feature maps. For example, with reference to FIG. 5, output feature maps 532 and 536 are provided to pooling layer 110. Pooling layer 110 downsamples output feature maps 532 and 536 (shown as second feature maps 118 in FIG. 1) to generate pooled feature maps 120, as shown in FIG. 1. Second pooling layer 110 provides pooled feature maps 120 to fully-connected layer 112, which classifies data item 122 based thereon.

III. Additional Example Embodiments

It is noted that while the embodiments described herein disclose that feature maps may be decomposed by decomposer 502 (as shown in FIG. 5) into high frequency components and low frequency components, feature maps may be decomposed into any number of components. For example, in certain embodiments, feature maps are decomposed into k discrete components, where k is any positive integer. For instance, in an embodiment in which k is 3, feature maps are decomposed into three subsets, where a first subset is representative of high frequency components, a second subset is representative of medium frequency components, and a third subset is representative of high frequency components.

In accordance with such embodiments, decomposer 502 utilizes a plurality of parameters that each determine which percentage of feature maps are to be allocated for a particular discrete component. It is noted that the number of convolutions performed by convolutional layer 500 corresponds to the value of k.

IV. Example Computer System Implementation

Convolutional neural network 102, first convolutional layer 104, first pooling layer 106, second convolutional layer 108, a second pooling layer 110, fully-connected layer 112, filter 202, filter 302, filter 402, decomposer 502, compressor 504, upsampler 508, downsampler 506, combiner 510, combiner 512, convolver 514, convolver 516, and filter 606 (and/or any of the components described therein), and/or flowchart 700, may be implemented in hardware, or hardware combined with one or both of software and/or firmware. For example, convolutional neural network 102, first convolutional layer 104, first pooling layer 106, second convolutional layer 108, a second pooling layer 110, fully-connected layer 112, filter 202, filter 302, filter 402, decomposer 502, compressor 504, upsampler 508, downsampler 506, combiner 510, combiner 512, convolver 514, convolver 516, and filter 606 (and/or any of the components described therein), and/or flowchart 700 may be implemented as computer program code/instructions configured to be executed in one or more processors and stored in a computer readable storage medium.

Alternatively, convolutional neural network 102, first convolutional layer 104, first pooling layer 106, second convolutional layer 108, a second pooling layer 110, fully-connected layer 112, filter 202, filter 302, filter 402, decomposer 502, compressor 504, upsampler 508, downsampler 506, combiner 510, combiner 512, convolver 514, convolver 516, and filter 606 (and/or any of the components described therein), and/or flowchart 700 may be implemented as hardware logic/electrical circuitry.

For instance, in an embodiment, one or more, in any combination, of convolutional neural network 102, first convolutional layer 104, first pooling layer 106, second convolutional layer 108, a second pooling layer 110, fully-connected layer 112, filter 202, filter 302, filter 402, decomposer 502, compressor 504, upsampler 508, downsampler 506, combiner 510, combiner 512, convolver 514, convolver 516, and filter 606 (and/or any of the components described therein), and/or flowchart 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
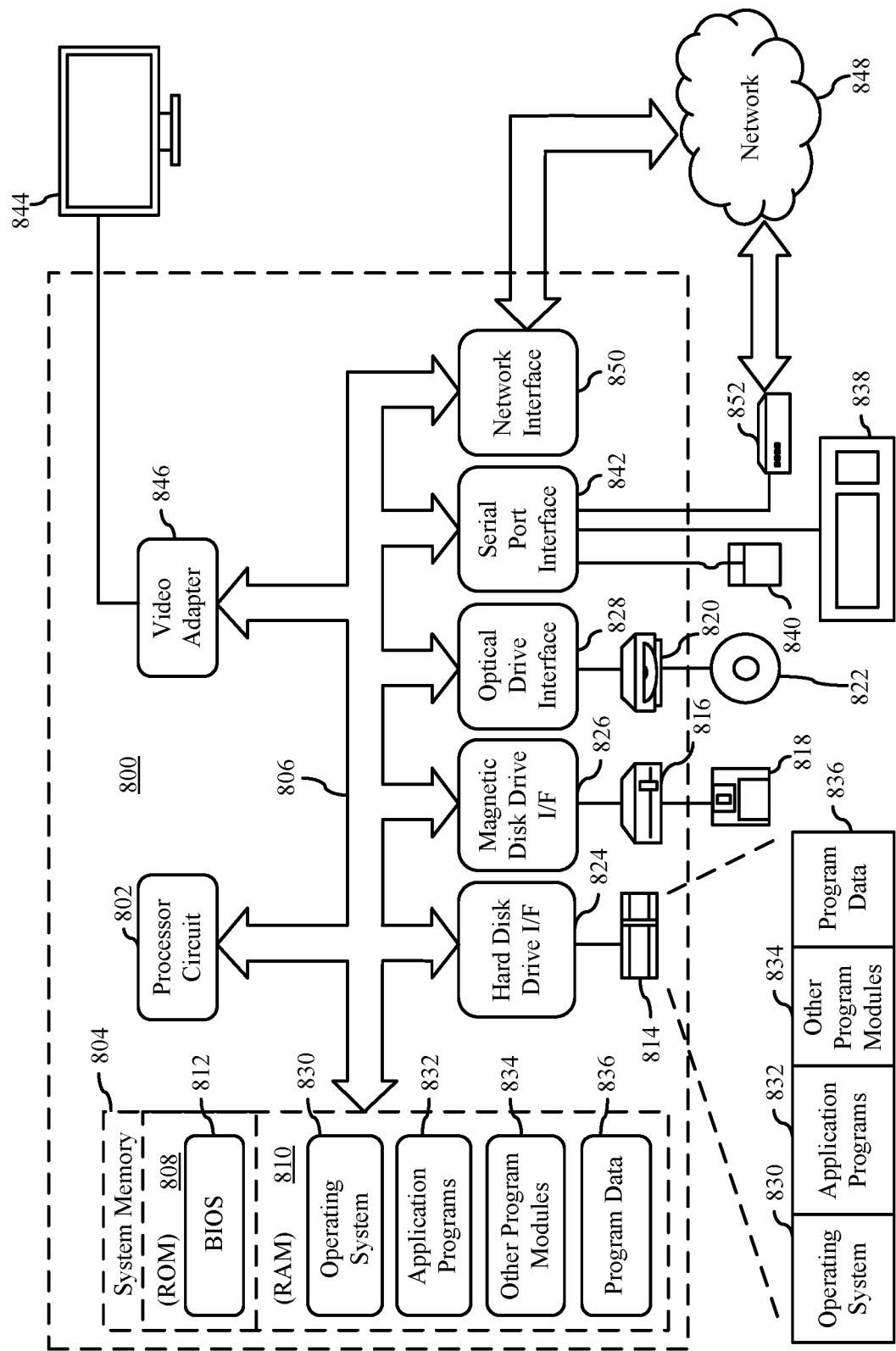
FIG. 8 is a block diagram of an example processor-based computer system that may be used to implement various embodiments.

FIG. 8 depicts an exemplary implementation of a computing device 800 in which embodiments may be implemented. For example, convolutional neural network 102, first convolutional layer 104, first pooling layer 106, second convolutional layer 108, a second pooling layer 110, fully-connected layer 112, filter 202, filter 302, filter 402, decomposer 502, compressor 504, upsampler 508, downsampler 506, combiner 510, combiner 512, convolver 514, convolver 516, and filter 606 (and/or any of the components described therein), and/or flowchart 700 (and/or any of the components described therein) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of convolutional neural network 102, first convolutional layer 104, first pooling layer 106, second convolutional layer 108, a second pooling layer 110, fully-connected layer 112, filter 202, filter 302, filter 402, decomposer 502, compressor 504, upsampler 508, downsampler 506, combiner 510, combiner 512, convolver 514, convolver 516, and filter 606 (and/or any of the components described therein), flowchart 700, and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

A method for classifying a data item via a convolutional neural network is described herein. The method comprises: decomposing a set of input feature maps that are based on a data item into a first subset representative of first frequency components of the data item and a second subset representative of second frequency components of the data item; combining the first subset with an upsampled version of the second subset to generate a first combined set, the upsampled version of the second subset determined based on a transposed convolution performed on each input feature map of the second subset; convolving the first combined set with at least a first filter to generate a set of first output feature maps; combining the second subset with a downsampled version of the first subset to generate a second combined set; convolving the second combined set with at least a second filter to generate a set of second output feature maps; and classifying the data item based on the set of first output feature maps and the set of second output feature maps.

In one embodiment of the foregoing method, said decomposing comprises: determining a parameter that defines a ratio between a first number of input feature maps to be included in the first subset and a second number of input feature maps to be included in the second subset; and decomposing the set of input feature maps into the first subset and the second subset based on the parameter.

In one embodiment of the foregoing method, the upsampled version of the second subset is generated by: upsampling the second subset to the resolution of the first subset.

In one embodiment of the foregoing method, the second frequency components are an octave lower than the first frequency components.

In one embodiment of the foregoing method, the downsampled version of the first subset is generated based on a pooling operation performed on each input feature map of the first subset.

In one embodiment of the foregoing method, the downsampled version of the first subset is generated by: downsampling the first subset to the resolution of the second subset.

In one embodiment of the foregoing method, the data item comprises at least one of: a digital image; an audio signal; a speech signal; or textual content.

A system is also described herein. The system includes at least one processor circuit; and at least one memory that stores program code configured to be executed by the at least one processor circuit, the program code comprising: a convolutional layer of a convolutional neural network configured to: decompose a set of input feature maps that are based on a data item into a first subset representative of first frequency components of the data item and a second subset representative of second frequency components of the data item; combine the first subset with an upsampled version of the second subset to generate a first combined set, the upsampled version of the second subset determined based on a transposed convolution performed on each input feature map of the second subset; convolve the first combined set with at least a first filter to generate a set of first output feature maps; combine the second subset with a downsampled version of the first subset to generate a second combined set; and convolve the second combined set with at least a second filter to generate a set of second output feature maps; and a fully-connected layer of the convolutional neural network configured to classify the data item based on the set of first output feature maps and the set of second output feature maps.

In one embodiment of the foregoing system, the convolutional layer is further configured to: determine a parameter that defines a ratio between a first number of input feature maps to be included in the first subset and a second number of input feature maps to be included in the second subset; and decompose the set of input feature maps into the first subset and the second subset based on the parameter.

In one embodiment of the foregoing system, the convolutional layer is configured to generate the upsampled version of the second subset by: upsampling the second subset to the resolution of the first subset.

In one embodiment of the foregoing system, the second frequency components are an octave lower than the first frequency components.

In one embodiment of the foregoing system, the convolutional layer generates the downsampled version of the first subset based on a pooling operation performed on each input feature map of the first subset.

In one embodiment of the foregoing system, the convolutional layer generates the downsampled version of the first subset by: downsampling the first subset to the resolution of the second subset.

In one embodiment of the foregoing system, the data item comprises at least one of: a digital image; an audio signal; a speech signal; or textual content.

A computer-readable storage medium having program instructions recorded thereon that, when executed by at least one processor of a computing device, perform a method for classifying a data item via a convolutional neural network. The method comprises: decomposing a set of input feature maps that are based on a data item into a first subset representative of first frequency components of the data item and a second subset representative of second frequency components of the data item; combining the first subset with an upsampled version of the second subset to generate a first combined set, the upsampled version of the second subset determined based on a transposed convolution performed on each input feature map of the second subset; convolving the first combined set with at least a first filter to generate a set of first output feature maps; combining the second subset with a downsampled version of the first subset to generate a second combined set; convolving the second combined set with at least a second filter to generate a set of second output feature maps; and classifying the data item based on the set of first output feature maps and the set of second output feature maps.

In one embodiment of the foregoing computer-readable storage medium, said decomposing comprises: determining a parameter that defines a ratio between a first number of input feature maps to be included in the first subset and a second number of input feature maps to be included in the second subset; and decomposing the set of input feature maps into the first subset and the second subset based on the parameter.

In one embodiment of the foregoing computer-readable storage medium, the upsampled version of the second subset is generated by: upsampling the second subset to the resolution of the first subset.

In one embodiment of the foregoing computer-readable storage medium, the second frequency components are an octave lower than the first frequency components.

In one embodiment of the foregoing computer-readable storage medium, the downsampled version of the first subset is generated based on a pooling operation performed on each input feature map of the first subset.

In one embodiment of the foregoing computer-readable storage medium, the downsampled version of the first subset is generated by: downsampling the first subset to the resolution of the second subset.

VI. Example Embodiments

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method for classifying a data item via a convolutional neural network, comprising:
    decomposing a set of input feature maps that are based on a data item into a first subset representative of first frequency components of the data item and a second subset representative of second frequency components of the data item;
    combining the first subset with an upsampled version of the second subset to generate a first combined set, the upsampled version of the second subset determined based on a transposed convolution performed on each input feature map of the second subset;
    convolving the first combined set with at least a first filter to generate a set of first output feature maps;
    combining the second subset with a downsampled version of the first subset to generate a second combined set;
    convolving the second combined set with at least a second filter to generate a set of second output feature maps; and classifying the data item based on the set of first output feature maps and the set of second output feature maps.

2. The method of claim 1, wherein said decomposing comprises:
  determining a parameter that defines a ratio between a first number of input feature maps to be included in the first subset and a second number of input feature maps to be included in the second subset; and
  decomposing the set of input feature maps into the first subset and the second subset based on the parameter.

3. The method of claim 1, wherein the upsampled version of the second subset is generated by:
  upsampling the second subset to the resolution of the first subset.

4. The method of claim 1, wherein the second frequency components are an octave lower than the first frequency components.

5. The method of claim 1, wherein the downsampled version of the first subset is generated based on a pooling operation performed on each input feature map of the first subset.

6. The method of claim 1, wherein the downsampled version of the first subset is generated by:
  downsampling the first subset to the resolution of the second subset.

7. The method of claim 1, wherein the data item comprises at least one of:
  a digital image;
  an audio signal;
  a speech signal; or
  textual content.

8. A system, comprising:
  at least one processor circuit; and
  at least one memory that stores program code configured to be executed by the at least one processor circuit, the program code comprising:
  a convolutional layer of a convolutional neural network configured to:
    decompose a set of input feature maps that are based on a data item into a first subset representative of first frequency components of the data item and a second subset representative of second frequency components of the data item;
    combine the first subset with an upsampled version of the second subset to generate a first combined set, the upsampled version of the second subset determined based on a transposed convolution performed on each input feature map of the second subset;
    convolve the first combined set with at least a first filter to generate a set of first output feature maps;
    combine the second subset with a downsampled version of the first subset to generate a second combined set; and
    convolve the second combined set with at least a second filter to generate a set of second output feature maps; and
  a fully-connected layer of the convolutional neural network configured to classify the data item based on the set of first output feature maps and the set of second output feature maps.

9. The system of claim 8, wherein the convolutional layer is further configured to:
  determine a parameter that defines a ratio between a first number of input feature maps to be included in the first subset and a second number of input feature maps to be included in the second subset; and
  decompose the set of input feature maps into the first subset and the second subset based on the parameter.

10. The system of claim 8, wherein the convolutional layer is configured to generate the upsampled version of the second subset by:
  upsampling the second subset to the resolution of the first subset.

11. The system of claim 8, wherein the second frequency components are an octave lower than the first frequency components.

12. The system of claim 8, wherein the convolutional layer generates the downsampled version of the first subset based on a pooling operation performed on each input feature map of the first subset.

13. The system of claim 8, wherein the convolutional layer generates the downsampled version of the first subset by:
  downsampling the first subset to the resolution of the second subset.

14. The system of claim 8, wherein the data item comprises at least one of:
  a digital image;
  an audio signal;
  a speech signal; or
  textual content.

15. A computer-readable storage medium having program instructions recorded thereon that, when executed by at least one processor of a computing device, perform a method for classifying a data item via a convolutional neural network, the method comprising:
  decomposing a set of input feature maps that are based on a data item into a first subset representative of first frequency components of the data item and a second subset representative of second frequency components of the data item;
  combining the first subset with an upsampled version of the second subset to generate a first combined set, the upsampled version of the second subset determined based on a transposed convolution performed on each input feature map of the second subset;
  convolving the first combined set with at least a first filter to generate a set of first output feature maps;
  combining the second subset with a downsampled version of the first subset to generate a second combined set;
  convolving the second combined set with at least a second filter to generate a set of second output feature maps; and
  classifying the data item based on the set of first output feature maps and the set of second output feature maps.

16. The computer-readable storage medium of claim 15, wherein said decomposing comprises:
  determining a parameter that defines a ratio between a first number of input feature maps to be included in the first subset and a second number of input feature maps to be included in the second subset; and
  decomposing the set of input feature maps into the first subset and the second subset based on the parameter.

17. The computer-readable storage medium of claim 15, wherein the upsampled version of the second subset is generated by:
  upsampling the second subset to the resolution of the first subset.

18. The computer-readable storage medium of claim 15, wherein the second frequency components are an octave lower than the first frequency components.

19. The computer-readable storage medium of claim 15, wherein the downsampled version of the first subset is generated based on a pooling operation performed on each input feature map of the first subset.

20. The computer-readable storage medium of claim 15, wherein the downsampled version of the first subset is generated by:
   downsampling the first subset to the resolution of the second subset.

\* \* \* \* \*